United States Patent [19]

Zucco, Jr.

[11] Patent Number: 4,467,254
[45] Date of Patent: Aug. 21, 1984

[54] MOTOR TRANSLATOR

[76] Inventor: Ernest Zucco, Jr., 64 Hooper St., Chelsea, Mass. 02150

[21] Appl. No.: 191,135

[22] Filed: Sep. 26, 1980

[51] Int. Cl.³ ............................................. H02K 29/04
[52] U.S. Cl. ..................................... 318/696; 318/685
[58] Field of Search ......................... 318/696, 603, 685

[56] References Cited

U.S. PATENT DOCUMENTS

| | | | |
|---|---|---|---|
| 3,967,176 | 6/1976 | Wagener et al. | 318/603 |
| 4,106,685 | 8/1978 | Strune et al. | 226/136 |
| 4,145,644 | 3/1979 | Liu | 318/696 |
| 4,156,170 | 5/1979 | Strune | 318/696 |
| 4,267,497 | 5/1981 | Cannon et al. | 318/661 |
| 4,282,472 | 8/1981 | Martin | 318/696 |
| 4,293,807 | 10/1981 | Foster et al. | 318/696 |

OTHER PUBLICATIONS

Handbook of Solid-State Devices, by Michael Thomason, Jr. (1979) p. 188 last three lines and p. 189 first three lines.

Primary Examiner—J. V. Truhe
Assistant Examiner—Saul M. Bergmann
Attorney, Agent, or Firm—Herbert L. Bello

[57] ABSTRACT

A motor translator with an up/down counter which inputs a preprogrammed read-only memory for selectively driving a multiple phase stepping motor. The read-only memory stores data at preselected locations and generates drive signals in a sequence which corresponds to the coil switching sequence of the stepping motor. The drive signals generated by the read-only memory in response to direction signals received from the up/down counter are applied to the motor for selective energization thereof.

1 Claim, 3 Drawing Figures 4,467,254

MOTOR TRANSLATOR

BACKGROUND OF THE INVENTION

1. Field of the Invention

The present invention relates to motor translators and, more particularly, is directed towards motor translators for multiple phase stepping motors.

2. Description of the Prior Art

Stepping motors are used in situations that require precise positioning or incremental movement of XY tables in a variety of manufacturing applications. Motor translators generate drive signals for controlling the operation of stepping motors. Generally, motor translators have been designed to operate with a particular stepping motor configuration and therefore have suffered from the disadvantage of limited application. A need exists for a motor translator which can be used with a variety of stepping motor configurations.

SUMMARY OF THE INVENTION

It is an object of the present invention to provide a motor translator which does not suffer from the heretofore described disadvantages.

Another object of the present invention is to provide a motor translator which is readily adapted for use with a plurality of stepping motor configurations. A motor translator embodying the invention includes direction steering circuitry having an up/down counter and a preprogrammed read-only memory. The direction steering circuitry receives signals from an input buffer and a homing circuit. The up/down counter generates direction signals in response to signals from the input buffer and the homing circuits. The read-only memory stores data in specified address locations and, in response to direction signals from the up/down counter, generates drive signals in a sequence which corresponds to the stepping motor coil switching sequence. These drive signals are applied to the stepping motor via a driver circuit for selectively energizing the stepping motor.

Other objects of the present invention will in part be obvious and will in part appear hereinafter.

The invention accordingly comprises the apparatus and system, together with its parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DESCRIPTION OF THE PREFERRED EMBODIMENTS

Figure 1:
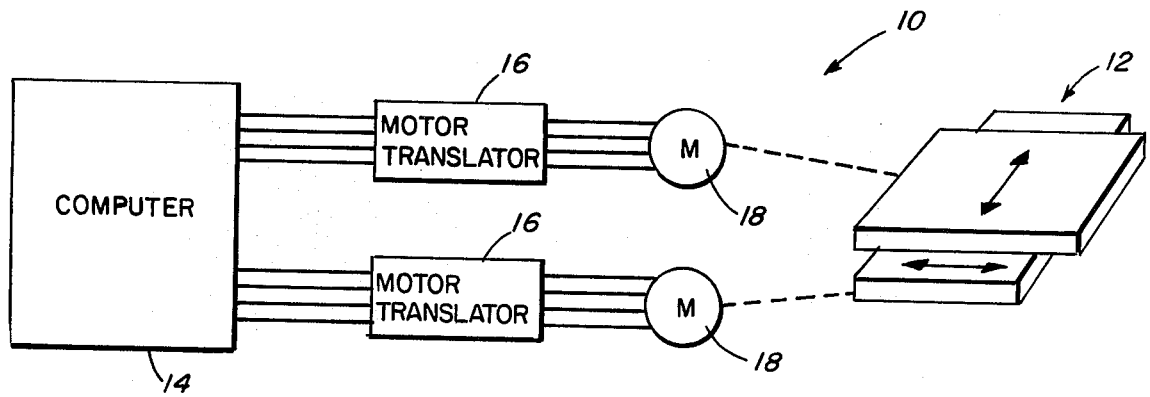
FIG. 1 is a block and schematic diagram of a positioning system having a motor translator embodying the invention.

Referring now to the drawings, particularly FIG. 1, there is shown a positioning system 10 for selectively moving an XY table 12. Positioning signals generated from a control 14, for example a computer, are applied to a pair of motor translators 16. Direction signals generated by motor translators 16 are applied to motors 18, for example stepping motors, which move XY table 12 in both the X and Y directions.

Figure 2:
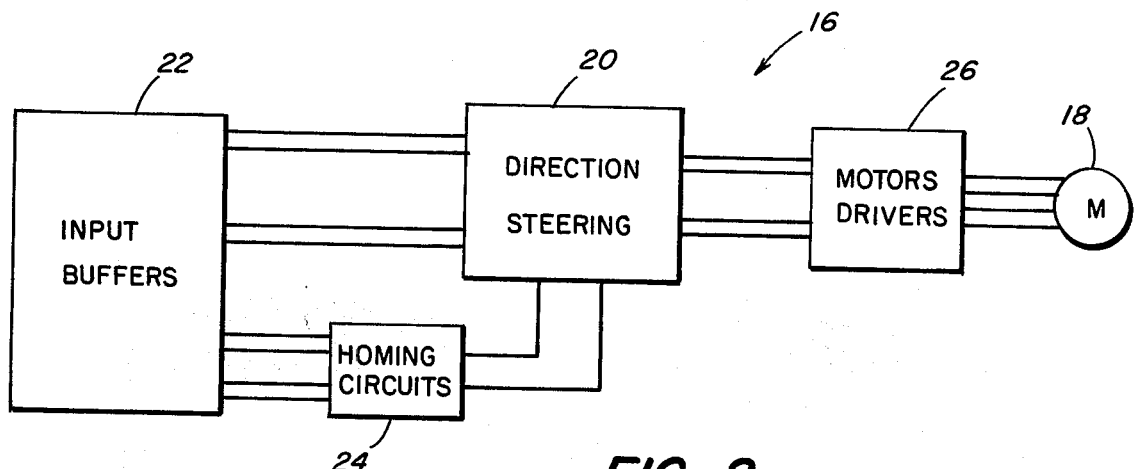
FIG. 2 is a block and schematic diagram of the motor translator of FIG. 1.

As shown in FIG. 2, position signals generated by computer 14 are applied to direction steering circuits 20 via input buffers 22. Homing circuits 24, which receive signals from input buffers 22, generate home signals that are applied to direction steering circuits 20. Direction signals at the output terminals of direction steering circuits 20 are applied to motor 18 via motor drivers 26. Motor translator 16 converts position signals generated by computer 14 into drive signals for a plurality of multiple phase stepping motor configurations. A detail schematic of motor translator 16 circuitry is shown in FIG. 3.

Figure 3:
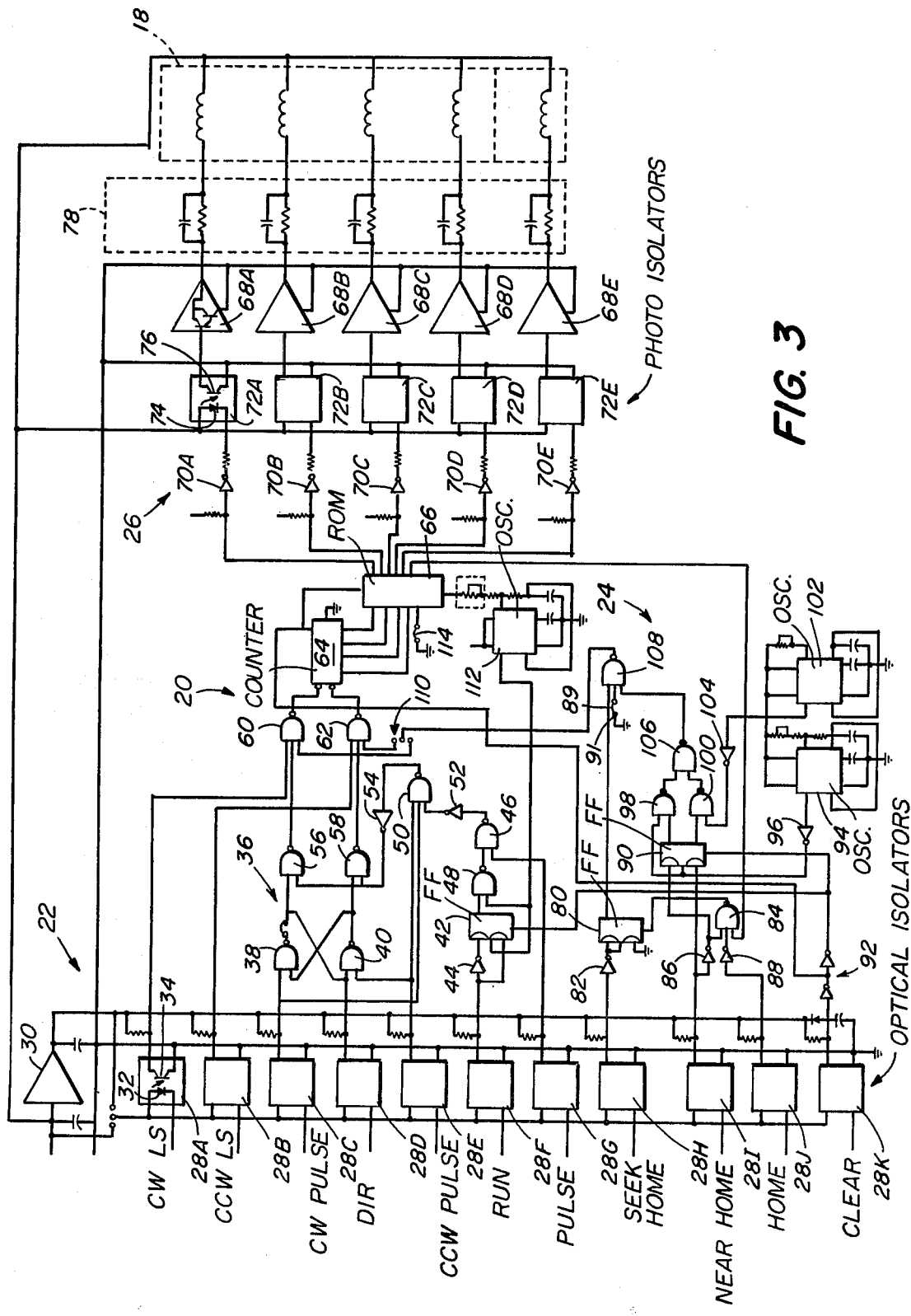
FIG. 3 is a detailed schematic of the motor translator of FIG. 2.

Referring now to FIG. 3, it will be seen that input buffers 22 includes a plurality of optical isolators 28A through 28K, and a voltage regulator 30. Each optical isolator 28 provides noise isolation and includes a light emitting diode 32 and a photo-transistor 34. Optical isolators 28A and 28B receive Clockwise (CW) Limit Switch signals and Counter-Clockwise (CCW) Limit Switch signals, respectively. Clockwise (CW) Pulse, Direction, and Counter-Clockwise (CCW) Pulse signals are applied to optical isolators 28C, 28D and 28E, respectively. Run and Pulse signals are applied to optical isolators 28F and 28G, respectively. Seek Home, Near Home and Home signals are applied to optical isolators 28H, 28I and 28J, respectively. A Clear signal is applied to optical isolator 28K.

The CW Pulse, Direction and CCW Pulse signals are fed to a set-reset flip-flop 36 having NAND gates 38 and 40. The Run signal is applied to a JK flip-flop 42 via an inverter 44. The signal at the output of JK flip-flop 42 is fed to a NAND gate 46 via a NAND gate 48. The Pulse signal is applied also to NAND gate 46. The signal at the output and NAND gate 46 inputs a NAND gate 50 via an inverter 52. The CW Pulse and the CCW Pulse signals are presented also at the input terminals of NAND gate 50. A pulsed signal at the output terminal of NAND gate 50 passes through an inverter 54 and is applied to an input terminal of NAND gates 56 and 58 which also receive input signals from set-reset flip-flop 36. The output terminals of NAND gates 56 and 58 are connected to the input terminals of NAND gates 60 and 62, respectively. The CW Limit Switch and the CCW Limit Switch signals are applied also to NAND gates 60 and 62. Pulses at the output terminals of NAND gates 60 and 62 are fed to an up/down counter 64 in direction steering circuits 20. Up/down counter 64 generates direction signals which input a preprogrammed read-only memory 66 in direction steering circuits 20. Read-only memory 66 stores data in specified address locations and, in response to the direction signals generated by up/down counter 64, generates drive signals in a sequence which corresponds to the coil switching sequence of stepping motor 16. Drive signals at the output terminals of read-only memory 66 are applied to a plurality of drivers 68A through 68E via buffers 70A-70E and photo-isolators 72A-72E. Each photo-isolator 72 provides noise isolation and includes a light emitting diode 74 and a photo-transistor 76. Drivers 68A-68E, for example power Darlington drivers, generate drive signals that are applied to the coils of stepping motor 18 via an R/C circuit 78. In the illustrated embodiment of FIG. 3, up/down counter 64 is a Binary Coded Decimal (BCD) counter and stepping motor 18 is a five phase motor. In an alternative embodiment, up/down counter 64 is a Binary counter and stepping motor in a four phase motor. As hereinafter described in the illustrated embodiment, stepping motor 18 positions XY table 12 at specified locations and at an initial starting location defined as a home position.

The Seek Home signal, which initiates a search for the home position, is applied to a JK flip-flop 80 via an inverter 82. The Near Home and Home signals are fed to a NAND gate 84 via inverters 86 and 88, respectively. The inverted Near Home signal and the Near Home signal input a JK flip-flop 90. An output signal from read-only memory 66 is applied to an input terminal of NAND gate 84, the output signal of NAND gate 84 being applied to the clear terminal of JK flip-flop 80. Up/down counter 64, JK flip-flop 42, JK flip-flop 90 and read-only memory 66 receive a Clear signal from a Schmidt trigger 92 which is inputted by the Clear signal. A jumper 89 connected at terminals 91 at an input of NAND gate 108 disables the homing capability.

As previously indicated, the Near Home signal and the inverted Near Home signal are applied to JK flip-flop 90. The clock input of JK flip-flop 90 receives slow clock pulses from an oscillator 94 via an inverter 96. The output terminals of JK flip-flop 90 are connected to NAND gates 98 and 100. NAND gate 98 receives the slow clock pulses from oscillator 94 via inverter 96 and NAND gate 100 receives fast clock pulses from an oscillator 102 via an inverter 104. Pulses at the output terminals of NAND gates 98 and 100 are applied to a NAND gate 106 which inputs a NAND gate 108. In addition, a Home signal at the output terminal of JK flip-flop 80 is applied also to NAND gate 108. The signal at the output of NAND gate 108 is fed either to an input terminal of NAND gate 60 or to an input terminal of NAND gate 62, depending upon the jumper connection at terminals 110.

Prior to describing the detailed operation of motor translator 16, it will be helpful to describe the function of the various input signals. In the illustrated embodiment, all signals are negative true or active at ground level and are driven by a device capable of sinking 12 volts DC at 16 MA or 5 volts DC at 16 MA for a TTL input. The Clear signal, when active, resets up/down counter 64 to zero state, inhibits the output of read-only memory 66, and curtails any homing in process. That is, no motion is possible when the Clear signal is in the active state. CW Limit Switch signal, when active, inhibits all rotation in the clockwise direction. The CCW Limit Switch signal, when active, inhibits all counter-clockwise rotation. The Pulse signal and the Direction signal applied to NAND gate 58 cause motor 18 to take one step for each pulse signal received at optical isolator 28G. When the Direction signal is in its active state, motor 18 runs in a counter-clockwise direction. The Run signal, when active, in conjunction with clock pulses from a free running oscillator 112 cause motor 18 to rotate in a direction designated by the Direction signal. In addition to the Pulse and Direction signals, the CW Pulse and the CCW Pulse signals are operative to rotate motor 18. Each CW Pulse moves motor 18 one step clockwise and each CCW Pulse moves the motor one step counter-clockwise. The Seek Home signal, when active, initiates search for the home position in a direction determined by the connection of the jumper at terminals 110. In seeking the home position, motor 18 rotates at a rate established by the pulse rate of fast clock oscillator 102. When a Near Home input signal is received from a microswitch (not shown) on XY table 12, motor 18 slows to a rate determined by the pulse rate of slow clock oscillator 94. Upon receipt of a Home signal from a microswitch (not shown) on XY table 12, motor 18 continues to rotate at the slow rate until state zero is reached. When rotation ceases, motor 18 is considered to be at the home position. In the illustrated embodiment, the motor drive signals at the output terminals of drivers 68 are capable of driving four or five coil stepping motors 18 in a unipolar R/L type drive configuration. Dropping resistors in R/C circuit 78 limit the coil current to approximately two amps.

In operation of system 10, heretofore described, command signals are generated by computer 14 and applied to motor translator 16. The CW Pulse and CCW Pulse signals are applied to set-reset flip-flop 36 together with the Direction signal. The signal at the output of NAND gate 38 is in state one for clockwise direction and state zero for counter-clockwise direction. The signal at the output terminal of NAND gate 40 is at state one for counter-clockwise rotation and at state zero for clockwise rotation. The signals at the output terminals of NAND gates 38 and 40 are applied to one input terminal of NAND gates 56 and 58, respectively. Another input terminal of NAND gates 56 and 58 receives a signal whenever the CW Pulse, CCW Pulse or Run signals are present. Positive pulses at the output terminals of NAND gates 56 and 58 are fed to NAND gates 60 and 62, respectively. Another input terminal of NAND gate 60 receives the CW Limit Switch signal. When the CW Limit Switch is low, motion is prevented in the clockwise direction. The CCW Limit Switch signal is applied to another input of NAND gate 62 and prevents motion in the counter-clockwise direction when this signal is low. Negative pulses at the output terminals of NAND gates 60 and 62 constitute counting pulses which are applied to up/down counter 64. Read-only memory 66 is preprogrammed to store signals from up/down counter 64 in specified address locations and to generate output signals in a sequence corresponding to the coil switching sequence of the particular stepping motor configuration. The particular combination of up/down counter 64 and preprogrammed read-only memory 66 provides a motor translator 16 which is readily adapted for use with a variety of motor configurations, e.g., four and five phase stepping motors.

In the case of five phase stepping motors, up/down counter 64 is a Binary Coded Decimal (BCD) counter. The CW pulses at the output of NAND gate 60 cause the counter 64 to count up and the CCW pulses at the output of NAND gate 62 cause the counter to count down. Counter 64 is set to zero (terminals denoted QA–QD=logic zero) by the Clear Pulse applied thereto from Schmidt trigger 92 or by a power-up condition. Each pulse received by up/down counter 64 increases or decreases the Binary Coded Decimal Value at the QA–QD terminals by one. Because counter 64 is a BCD counter, the maximum count is nine. When counter 64 is at state nine, additional up count pulses cause counter 64 to go from state nine to state zero to state one to state two to state three, and so forth. When counter 64 is at state zero, down pulses cause the counter to go from state zero to state nine to state eight to state seven, and so forth. The output terminals QA–QD of counter 64 are connected to the address input terminals of read-only memory 66, e.g., a 32 by 8 bit read-only memory which stores data representing motor 16 coil switching sequences. In the case of a five phase motor, there are ten unique motor coil on/or configurations or states. As counter 64 is incremented or decremented, sequential motor states are addressed out of read-only memory 66 and applied to motor 18 through Darlington driver 68. Whenever up/down counter 64 is in its zero state (QA–QD=logic zero), read-only memory 66 generates a home indicating signal which is used in conjunction with the home and near home microswitches on XY table 12 to stop motor 18 when XY table is at the home position.

In the case of four phase motors, the operation of motor translator 16 is similar to that described in connection with five phase motors, with the exception that up/down counter 64 is a straight binary counter with a maximum count of fifteen (QA–QD=logic one). The stored data in read-only memory 66 represents the coil switching sequence of a four phase motor. When motor translator is used with four phase motors, there is a choice of using a four state or an eight state configuration. In the four state configuration, the lower half of read-only memory 66 is addressed (addresses 0-15) with a four state configuration and there are four unique motor states. Since a straight binary counter addresses sixteen states, read-only memory 66 is programmed with repeated data. When used in an eight state configuration, only the upper half of read-only memory 66 is addressed (addresses 16-31). As previously indicated, since counter 64 addresses sixteen states and the eight state configuration has eight states, read-only memory 66 is programmed with repeated data. The eight state sequencing configuration is activated by connecting a jumper 114 at an input of read only memory 66, with jumper 114 removed, motor translator 16 is in the four state sequencing configuration.

Since certain changes may be made in the foregoing description without departing from the scope of the invention herein involved, it is intended that all matter contained in the above description and depicted in the accompanying drawings be construed in an illustrative and not in a limiting sense.

What I claim is:

1. In combination with a multiple coil motor, a device for controlling the motor, said device comprising:
   (a) means for generating command signals;
   (b) input means for receiving said command signals,
   (c) an up/down binary coded decimal counter connected to said input means for receiving said command signals and generating direction signals; and
   (d) a read-only memory connected to said counter for receiving said direction signals and for generating drive signals for controlling the motor, said read-only memory storing data representing a coil switching sequence of the motor.

* * * * *